United States Patent [19]

Onodera et al.

[11] Patent Number: 4,620,622

[45] Date of Patent: Nov. 4, 1986

[54] WHEEL HUB CLUTCH ASSEMBLY

[75] Inventors: Takayoshi Onodera, Toyota; Tooru Kagata, Kariya, both of Japan

[73] Assignees: Toyota Jidosha Kabushiki Kaisha, Toyota; Aisin Seiki Kabushiki Kaisha, Kariya, both of Japan

[21] Appl. No.: 647,384

[22] Filed: Sep. 5, 1984

[30] Foreign Application Priority Data

Sep. 5, 1983 [JP] Japan .................... 58-162930

[51] Int. Cl.$^4$ .................... F16D 11/00; B60K 17/34
[52] U.S. Cl. .................... 192/36; 192/67 R; 192/93 A
[58] Field of Search ............ 192/35, 36, 67 R, 54, 192/93 A; 403/1

[56] References Cited

U.S. PATENT DOCUMENTS

| | | | |
|---|---|---|---|
| 3,124,377 | 3/1964 | O'Brien et al. | 192/67 R |
| 4,043,226 | 8/1977 | Buuck | 192/67 R |
| 4,269,294 | 5/1981 | Kelbel | 192/54 |
| 4,287,972 | 9/1981 | Petrak | 192/67 R |
| 4,300,667 | 11/1981 | Fogelberg | 192/36 |
| 4,327,821 | 5/1982 | Telford | 192/67 R |
| 4,368,808 | 1/1983 | Teraoka | 192/67 R |
| 4,441,597 | 4/1984 | Teraoka | 192/67 R |
| 4,470,491 | 9/1984 | Teraoka | 403/1 |

Primary Examiner—Lawrence Staab
Attorney, Agent, or Firm—Oblon, Fisher, Spivak, McClelland & Maier

[57] ABSTRACT

A wheel hub clutch assembly which includes a body attached to a wheel hub, an inner sleeve contained within the body and fixed to a driveable axle, a clutch member splined to the sleeve to be maintained in its disengaged position during operation for two-wheel drive and to be engaged with the body in clutching operation to couple the wheel hub to the axle for four-wheel drive, a cam ring formed at one side thereof with a cam face and rotatable on the sleeve, a cam follower splined to the sleeve and oepratively connected with the clutch member, the cam follower being loaded toward the cam ring to cooperate with the cam face so as to move the clutch member to its engaged position in response to rotation of the sleeve, a brake assembly for applying the brake to the cam ring by engagement therewith in response to rotation of the cam follower, and a slide ring rotatably coupled over the cam ring and associated with the cam follower and brake assembly for releasing the brake by engagement with the brake assembly when rotated by engagement with the cam follower. The cam face of the cam ring reliably disengages the cam ring from the brake assembly by engagement with the cam follower in clutching operation.

5 Claims, 7 Drawing Figures

Fig. 3
PRIOR ART
Fig. 4
PRIOR ART
Fig. 5
PRIOR ART
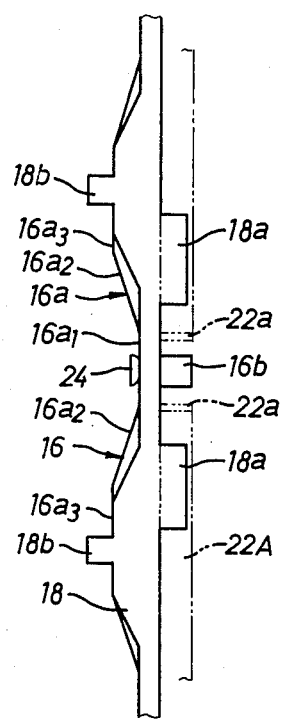
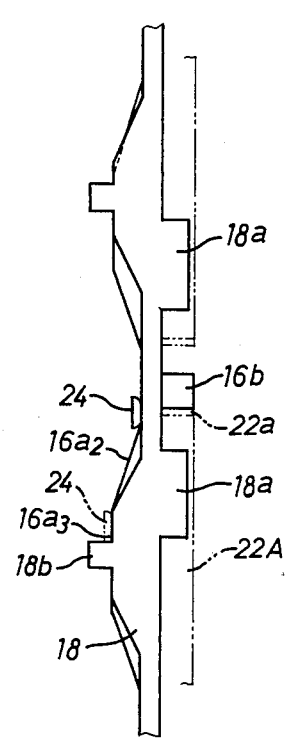
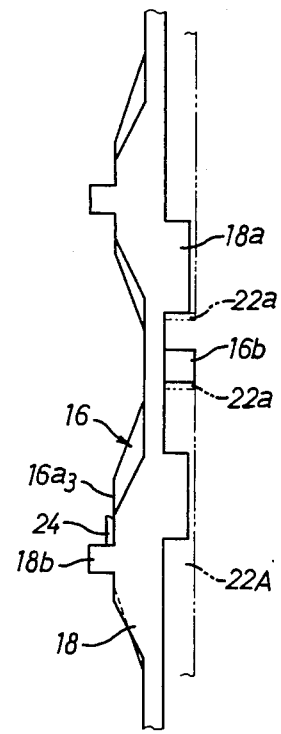

WHEEL HUB CLUTCH ASSEMBLY

BACKGROUND OF THE INVENTION

1. Field of the Invention

The present invention relates to a wheel hub clutch assembly for automotive vehicles of the four-wheel drive type, and more particularly to an improvement of a wheel hub clutch assembly arranged to automatically couple and uncouple a wheel hub to and from a driveable axle so as to selectively provide four-wheel drive or two-wheel drive.

2. Background of the Art

Such a wheel hub clutch assembly as described above comprises a cylindrical body attached to a wheel hub, an inner sleeve contained within the cylindrical body and fixedly mounted on a driveable axle, a clutch member splined to the inner sleeve to be maintained in its disengaged position during operation for two-wheel drive and to be engaged with the body in clutching operation to drivingly couple the wheel hub to the axle for four-wheel drive, a cam ring formed at one side thereof with a cam face and rotatably mounted on the inner sleeve, a cam follower arranged between the clutch member and the cam ring and splined to the inner sleeve to cooperate with the cam face of the cam ring to be axially moved to and from the clutch member in response to rotation of the inner sleeve, a return spring for loading the cam follower toward the cam face of the cam ring, means for connecting the cam follower with the clutch member, a brake assembly mounted within the cylindrical body and associated with the cam ring for applying the brake to the cam ring by engagement therewith in response to rotation of the cam follower, and a slide ring rotatably coupled over the cam ring and associated with the cam follower and the brake assembly for releasing the brake by engagement with the brake assembly when rotated by engagement with the cam follower. For the actual practice of the wheel hub clutch assembly, various tests and experiments have been conducted by the inventors. In these tests and experiments, it has been observed that the cam ring may not be disengaged from the brake assembly when the slide ring is rotated by engagement with the cam follower to release the brake in clutching operation. This causes undesired drag torque in the wheel hub clutch assembly during operation for four-wheel drive, resulting in defacement of the brake assembly in a short period of time and loss of the power.

SUMMARY OF THE INVENTION

It is, therefore, a primary object of the present invention to provide a wheel hub clutch assembly the cam ring of which is improved to reliably effect disengagement of the cam ring from the brake assembly for release of the brake in clutching operation thereby to prevent occurrence of the undesired drag torque during operation for four-wheel drive.

According to the present invention, the object is accomplished by providing a wheel hub clutch assembly the cam ring of which is formed at one side thereof with a cam face including a flat valley portion for receiving thereon the cam follower to maintain the clutch member in its disengaged position, a sloped portion extending circumferentially and axially outwardly from the flat valley portion to effect axial movement of the cam follower toward and away from the clutch member by engagement with the cam follower, and a flat ridge portion extending circumferentially from the slope portion for receiving thereon the cam follower to effect and maintain engagement of the clutch member with the body, wherein the flat ridge portion of the cam ring is formed with a recess, one end surface of which is tapered to effect disengagement of the cam ring from the brake assembly by engagement with the cam follower in clutching operation.

BRIEF DESCRIPTION OF THE DRAWINGS

Additional objects and advantages of the present invention will become readily apparent from the following detailed description of a preferred embodiment thereof when taken together with accompanying drawings, in which:

FIGS. 3-6 partly illustrate a cam portion of a conventional cam ring and part of the associated cam follower and slide ring in the wheel hub clutch assembly, in which FIGS. 3-5 illustrate the relative position of the cam ring, the cam follower and the slide ring in clutching operation of the clutch assembly, and FIG. 6 illustrates the relative position of such structure in declutching operation of the clutch assembly.

DETAILED DESCRIPTION OF THE PREFERRED EMBODIMENT

Figure 1:
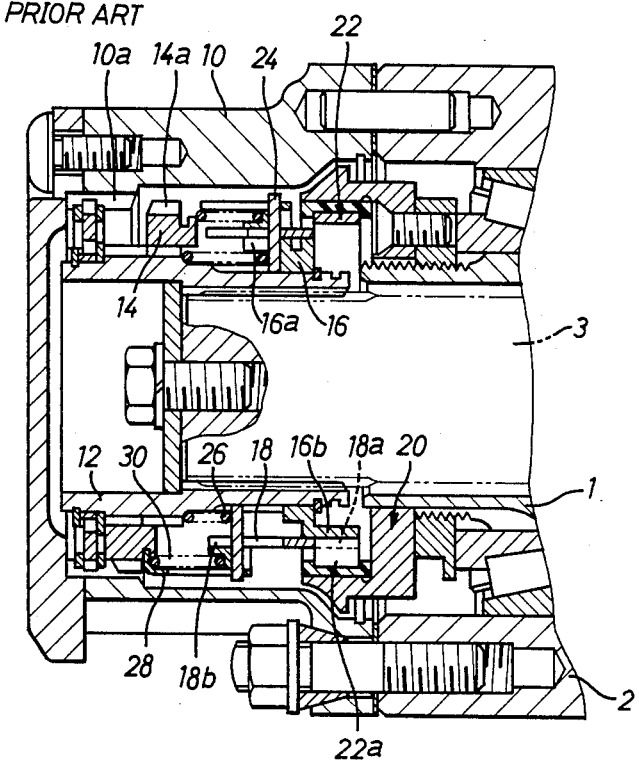
FIG. 1 is a sectional view of a wheel hub clutch assembly to be improved by the present invention.
Figure 2:
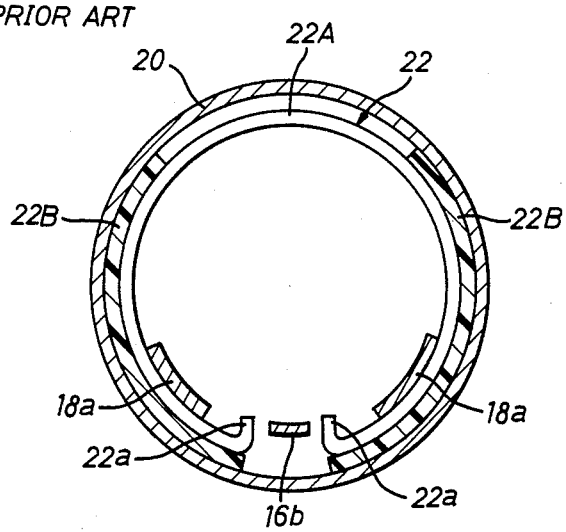
FIG. 2 is a cross-sectional view illustrating an arrangement of a band brake assembly in relation to axial projections of a cam ring and a slide ring of the wheel hub clutch assembly shown in FIG. 1.
Figure 6:
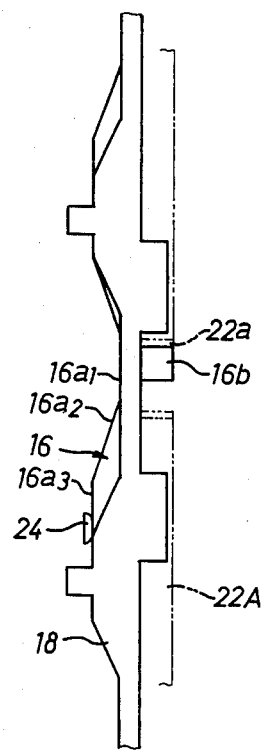

Referring now to the attached drawings, a preferred embodiment of the present invention is described in contrast with a conventional embodiment. For a better understanding, a preferred embodiment of a prior art wheel hub clutch assembly is described in detail with reference to FIGS. 1-6 of the drawings. As is illustrated in FIGS. 1-3, the prior art wheel hub clutch assembly includes a cylindrical body 10 secured to a wheel hub 2 which is rotatably mounted on the outer end of a stationary axle tube 1 by means of a tapered roller bearing in a usual manner. The wheel hub clutch assembly further comprises an inner sleeve 12 contained within the cylindrical body 10 and fixed to the outer end of a driveable axle 3 by means of a spline connection, an annular clutch member 14 axially slidably splined to the inner sleeve 12 for transmission of a driving torque from the axle 3 to the wheel hub 2, a cam ring 16 rotatably mounted on the inner sleeve 12, a slide ring 18 rotatably coupled over the cam ring 16, a drum brake assembly including a brake drum 20 fixed to the axle tube 1 by means of fastening bolts, and a brake band assembly 22 mounted within the brake drum 20, an annular cam follower 24 arranged between the cam ring 16 and clutch member 14 and axially slidably splined to the inner sleeve 12 for rotation therewith, an inner coil spring or return spring 26 engaged at its one end with an annular shoulder of inner sleeve 12 for loading the cam follower 24 toward the cam ring 16, and a connecting assembly including an annular joint member 28 hooked at its opposite ends on the clutch member 14 and cam follower 22 and an outer coil spring 30 interposed between the cam follower 24 and clutch member 14.

The clutch member 14 is integrally formed with external teeth or splining 14a which are arranged to be brought into engagement with internal teeth or splining 10a of the cylindrical body 10 in clutching operation. As can be well seen in FIG. 3, the cam ring 16 is formed at its leftside with a cam face 16a which includes a flat valley portion $16a_1$, a pair of sloped portions $16a_2$ extending circumferentially and axially outwardly from the opposite ends of valley portion $16a_1$, and a pair of flat ridge portions $16a_3$ extending circumferentially from the respective slope portions $16a_2$. The cam ring 16 is further formed at its rightside with an axial projection 16b. As shown FIG. 2, the brake band assembly 22 includes an annular leaf spring 22A and a pair of brake shoes 22B secured to the outer periphery of leaf spring 22A. The annular leaf spring 22A has a pair of circumferentially spaced radial lugs 22a, 22a which are arranged to be brought into engagement with the axial projection 16b of cam ring 16 upon rotation of the cam follower 24. When engaged with the axial projection 16b of cam ring 16, the annular leaf spring 22A is expanded radially outwardly, and the brake shoes 22B cooperate with the brake drum 20 so as to cause a drag torque. The cam follower 24 is arranged to be axially moved toward the clutch member 14 by engagement with one of the slope portions $16a_2$ of cam ring 16 in response to initial rotation of the axle 3. The slide ring 18 is formed at its rightside with a pair of circumferentially spaced axial projections 18a, 18a to be brought into engagement with one of the radial lugs 22a of brake band assembly 22. The slide ring 18 is further formed at its leftside with a pair of circumferentially spaced axial projections 18b, 18b which are located outside the cam face 16a of cam ring 16. When one of the axial projections 18a of slide ring 18 is engaged with one of the radial lugs 22a of leaf spring 22A, the diameter of leaf spring 22A is reduced so as to disengage the brake shoes 22B from the brake drum 20.

When the axle 3 is driven by a prime mover of the vehicle, the cam follower 24 is integrally rotated with the inner sleeve 12 in response to initial rotation of the axle 3, and in turn, the cam ring 16 is rotated by engagement with the cam follower 24 at its slope portion $16a_2$. Subsequently, the axial projection 16b of cam ring 16 abuts against one of the radial lugs 22a of brake band assembly 22 to apply the brake to the cam ring 16. (see FIG. 4) As a result, the cam follower 24 is rotated relatively to the cam ring 16 and is moved axially outwardly toward the clutch member 14 by engagement with the slope portion $16a_2$ of cam ring 16 under the loading of return spring 26. Thus, the cam follower 24 is brought into engagement with the flat ridge portion $16a_3$ of cam ring 16 and supported in place. Such axial movement of the cam follower 24 is transmitted to the clutch member 14 through the spring 30 such that the clutch member 14 is pushed axially outwardly to engage the internal splining 10a of body 10 at its external splining 14a, as is illustrated by a lower half of FIG. 1. Thus, the inner sleeve 12 is coupled to the cylindrical body 10 through the clutch member 14 to drivingly connect the wheel hub 2 with the axle 3. In such clutching operation as described above, the cam follower 24 is brought into engagement with one of the axial projections 18b of slide ring 18. Thus, as is illustrated in FIG. 5, the slide ring 18 is rotated by engagement with the cam follower 24 and abuts against the other radial lug 22a of brake band assembly 22 at its axial projection 18a to reduce the diameter of leaf spring 22A to thereby disengage the brake shoes 22B from the brake drum 20.

To uncouple the inner sleeve 12 from the cylindrical body 10, the axle 3 is positioned in a usual manner to be free from the prime mover of the vehicle, and the vehicle is slightly moved rearward by a two-wheel drive to effect reverse rotation of the wheel hub 2. As a result, the inner sleeve 12 is rotated by the wheel hub 2 through the clutch member 14 to effect reverse rotation of the cam follower 24. Subsequently, the cam ring 16 is rotated by engagement with the cam follower 24 under the loading of return spring 26 and abuts against the other radial lug 22a of brake band assembly 22 at its axial projection 16b to be applied with the brake. (see FIG. 6) Thus, the cam follower 24 is further rotated relatively to the cam ring 16 in the reverse direction and is brought into engagement with the flat valley portion $16a_1$ of cam ring 16 under the loading of return spring 26. Simultaneously, the clutch member 14 is moved axially inwardly by the cam follower 24 through the joint member 28 to disengage the external splining 14a of clutch member 14 from the internal splining 10a of cylindrical body 10.

In actual practice of the prior art wheel hub clutch assembly, it has been observed that when the slide ring 18 is rotated by engagement with the cam follower 24 and abuts against the other radial lug 22a of leaf spring 22A at its axial projection 18a in clutching operation, the cam ring 16 may not be reliably disengaged at its axial projection 16b from the radial lug 22a of leaf spring 22A. Under such a condition, both the radial lugs 22a of leaf spring 22A tend to move circumferentially in the same direction due to engagement with the cam ring 16 and slide ring 18. This causes undesired drag torque in the hub clutch assembly during operation for four-wheel drive, resulting in defacement of the brake band assembly 22 in a short period of time and loss of the power.

Figure 7:
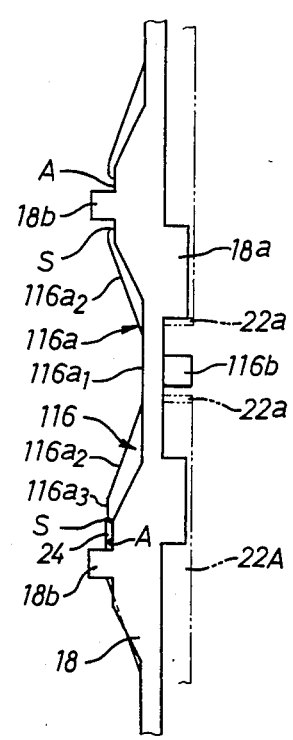
FIG. 7 illustrates a cam portion of an improved cam ring according to the present invention and part of the associated cam follower and slide ring.

Referring now to FIG. 7 of the attached drawings, there is illustrated an improved cam ring 116 in accordance with the present invention which is associated with the cam follower 24 of the wheel hub clutch assembly illustrated in FIGS. 1 and 2. A cam face 116a of cam ring 116 includes a flat valley portion 116a for receiving thereon the cam follower 24 to maintain the clutch member 14 in its disengaged position, a pair of sloped portions 116a extending circumferentially and axially outwardly from the opposite ends of flat valley portion $116a_1$ to effect axial movement of the cam follower 24 toward and away from the clutch member 14 by engagement with the cam follower 24, and a pair of flat ridge portions $116a_3$ extending circumferentially from the respective slope portions $116a_2$ for receiving thereon the cam follower 24 to effect engagement of the external splining 14a of clutch member 14 with the internal splining of body 10. The improved cam ring 116 is characterized in that the flat ridge portions $116a_3$ are respectively formed with a circumferential recess A one end of which is formed with a tapered surface S for effecting reverse rotation of the cam ring 116 by engagement with the cam follower 24 in clutching operation. In this arrangement, the recess A extends circumferentially a predetermined distance to receive the cam follower 24 thereon so as to permit abutment of the cam follower 24 against the axial projection 18b of slide ring 18 in clutching operation. The other cam face portions of cam ring 116 are substantially the same as those of the conventional cam ring 16, and also the other component parts are substantially the same as those of the prior art wheel hub clutch assembly.

Hereinafter, operation of the wheel hub clutch assembly equipped with the improved cam ring 116 will be described with reference to FIGS. 1, 2 and 7. When the cam follower 24 is brought into engagement with the flat ridge portion 116$a_3$ of cam ring 116 in clutching operation of the wheel hub clutch assembly, it is received by the tapered surface S of recess A in the flat ridge portion 116$a_3$. Under such a condition, the cam ring 116 is reversely rotated in a distance by the circumferential biasing force of spring 26 acting thereon so that the cam follower 24 is brought into engagement with the circumferential recess A in flat ridge portion 116$a_3$ of cam ring 116. As a result, the axial projection 116$b$ of cam ring 116 is separated from the radial lug 22$a$ of leaf spring 22A, as is illustrated in FIG. 7. Subsequently, the cam follower 24 is brought into engagement with the axial projection 18$b$ of slide ring 18 to rotate the slide ring 18 relatively to the cam ring 116. Thus, the slide ring 18 abuts against the other radial lug 22$a$ of leaf spring 22A at its axial projection 18$a$ to reduce the diameter of leaf spring 22A so as to disengage the brake shoes 22B from the brake drum 20. The other clutching operation is substantially the same as that of the prior art wheel hub clutch assembly.

When the vehicle is slightly moved rearwards by two-wheel drive after four-wheel drive to effect reverse rotation of the wheel hub 2 in declutching operation of the wheel hub clutch assembly, the inner sleeve 12 is rotated by the wheel hub 2 through the clutch member 14 to effect reverse rotation of the cam follower 24, and in turn, the cam ring 116 is rotated in the reverse direction by engagement with the cam follower 24 at its tapered surface S of the recess A under the loading of return spring 26 and abuts against the radial lug 22$a$ of leaf spring 22A at its axial projection 116$b$ to be applied with the brake. When the cam follower 24 is further rotated relatively to the cam ring 116 in the reverse direction, it is brought into engagement with the sloped portion 116$a_2$ of cam ring 116 via the tapered surface S under the loading of return spring 26. Under such a condition, the axial projection 116$b$ of cam ring 116 is separated from the radial lug 22$a$ of leaf spring 22A by the circumferential biasing force of spring 26 acting thereon, while the cam follower 24 is brought into engagement with the flat valley portion 116$a_1$ of cam ring 116. Thus, the clutch member 14 is disengaged from the cylindrical body 10 and maintained in its disengaged position.

Having now fully set forth both structure and operation of a preferred embodiment of the concept underlying the present invention, various other embodiments as well as certain modifications of the embodiment herein shown and described will obviously occur to those skilled in the art upon becoming familiar with said underlying concept. For example, in the actual practices of the present invention, the circumferential recess A of cam ring 116 may be replaced with a V-shaped recess, and the brake band assembly 22 may be arranged in surrounding relationship with the brake drum 20. Alternatively, the slide ring 18 may be arranged within the cam ring 116. It is, therefore, to be understood that within the scope of the appended claims, the invention may be practiced otherwise than as specifically set forth herein.

What is clamed is:

1. A wheel hub clutch assembly comprising:

a cylindrical body provided therein with internal splining and to be attached to a wheel hub;

an inner sleeve contained within said cylindrical body to be fixedly mounted on a drivable axle;

a clutch member provided thereon with external splining and splined to said inner sleeve to be maintained in a first position in which the external splining of said cluth member is disengaged from the internal splining of said body to uncouple said wheel hub from said axle and to be axially moved from the first position to a second position in which the external splining of said clutch member is engaged with the internal splining of said body to drivingly couple said wheel hub to said axle;

a cam ring formed at one side thereof with a cam face and rotatably mounted on said inner sleeve;

a cam follower arranged between said clutch member and said cam ring and splined to said inner sleeve to cooperate with the cam face of said cam ring to be moved toward and away from said clutch member in response to rotation of said inner sleeve;

a return spring for loading said cam follower toward the cam face of said cam ring;

means for connecting said cam follower with said clutch member;

a brake assembly mounted within said cylindrical body and associated with said cam ring for applying the brake to said cam ring by engagement therewith in response to rotation of said cam follower;

a slide ring rotatably coupled over said cam ring and associated with said cam follower and said brake assembly for releasing the brake by engagement with said brake assembly when rotated by engagement with said cam follower in clutching operation.

wherein the cam face of said cam ring includes a valley portion for receiving thereon said cam follower to maintain said clutch member in the first position, a slope portion extending circumferentially and axially outwardly from said valley portion to effect axial movement of said cam follower toward and away from said clutch member by engagement with said cam follower, and a flat ridge portin extending circumferentially from said slope portion for receiving thereon said cam follower to effect and maintain engagement of the external splinging of said clutch member with the internal splining of said body, and wherein the flat ridge portin of said cam ring is formed with a recess which extends circumferentially in a predetermined distance to receive said cam follower therein so as to permit abutment of said cam follower against said slide ring in the clutching operation, one end surface of said recess being tapered to effect disengagement of said cam ring from said brake assembly by engagement with said cam follower in the clutching operation.

2. A wheel hub clutch assembly as claimed in claim 1, wherein said recess in the flat ridge portion of said cam ring extends circumferentially in a predetermined distance to receive said cam follower thereon so as to permit abutment of said cam follower against said slide ring in clutching operation.

3. A wheel hub clutch assembly as claimed in claim 1, wherein said cam ring is formed at the other side thereof with an axial projection to be brought into engagement with said brake assembly, and wherein said slide ring is formed at one side thereof with a first axial projection to be brought into engagement with said brake assembly and at the other side thereof with a second axial projection to be brought into engagement with said cam follower.

4. A wheel hub clutch assembly as claimed in claim 3, wherein said slide ring is rotatably coupled over said cam ring.

5. A wheel hub clutch assembly as claimed in claim 1, wherein said brake assembly further comprises a brake drum fixed to a stationary axle tube in surrounding relationship with said axle, an annular leaf spring contained within said brake drum and having a pair of circumferentially spaced radial lugs to be engaged with an axial projection of said cam ring, and a brake shoe secured to the outer periphery of said leaf spring to cause a drag torque by engagement with said brake drum, and wherein said slide ring is formed at a first side thereof with a first axial projection to be brought into engagement with one of the radial lugs of said leaf spring and at a second side thereof with a second axial projection to be brought into engagement with said cam follower in clutching operation.

* * * * *